United States Patent
Hwang et al.

(10) Patent No.: US 8,204,183 B2
(45) Date of Patent: Jun. 19, 2012

(54) METHOD, APPARATUS, AND COMPUTER READABLE MEDIUM THEREOF FOR ENABLING AN INTERNET EXTENSION TO RING A CONVENTIONAL EXTENSION

(75) Inventors: Shaw-Hwa Hwang, Hsinchu (TW); Keng-Yu Lin, Taipei (TW)

(73) Assignee: Institution for Information Industry, Taipei (TW)

( * ) Notice: Subject to any disclaimer, the term of this patent is extended or adjusted under 35 U.S.C. 154(b) by 627 days.

(21) Appl. No.: 12/345,014

(22) Filed: Dec. 29, 2008

(65) Prior Publication Data

US 2010/0124316 A1    May 20, 2010

(30) Foreign Application Priority Data

Nov. 20, 2008    (TW) ................ 97144925 A

(51) Int. Cl.
*H04M 1/64*    (2006.01)
*H04L 12/66*    (2006.01)

(52) U.S. Cl. ..................... 379/88.17; 370/352

(58) Field of Classification Search ........... 379/262, 379/355.01–355.09, 216; 370/352–356
See application file for complete search history.

(56) References Cited

U.S. PATENT DOCUMENTS

| | | | |
|---|---|---|---|
| 2005/0018659 A1* | 1/2005 | Gallant et al. ............... | 370/352 |
| 2005/0174990 A1* | 8/2005 | Riemann et al. ............. | 370/352 |
| 2006/0018308 A1* | 1/2006 | Choi et al. ................... | 370/352 |
| 2006/0203983 A1* | 9/2006 | Tiliks et al. ............. | 379/114.05 |
| 2008/0075266 A1 | 3/2008 | Yang et al. | |
| 2010/0074100 A1* | 3/2010 | Suzuki et al. ............... | 370/221 |

FOREIGN PATENT DOCUMENTS

| | | |
|---|---|---|
| CN | 1848876 A | 10/2006 |
| KR | 2003-0015800 | 2/2003 |
| KR | 2003-0063063 | 7/2003 |
| KR | 2008-0055199 | 6/2008 |

\* cited by examiner

*Primary Examiner* — Md S Elahee
*Assistant Examiner* — Solomon Bezuayehu
(74) *Attorney, Agent, or Firm* — Patterson Thuente Christensen Pedersen, P.A.

(57) ABSTRACT

A method, an apparatus, and a computer program product thereof for enabling an Internet extension to ring a conventional extension are disclosed. The apparatus comprises an SIP proxy and an RTP relay. The SIP proxy receives a calling request from the Internet extension, substitutes an exchange number for a conventional extension number comprised in the calling request, and transmits the substituted calling request to a gateway, so that the substituted calling request can be transmitted to a voice automatic machine via a telephone exchange. The RTP relay transmits the conventional extension number in DTMF format to the gateway. Thus, this invention enables the Internet extension to ring the conventional extension with lower hardware costs.

20 Claims, 4 Drawing Sheets

METHOD, APPARATUS, AND COMPUTER READABLE MEDIUM THEREOF FOR ENABLING AN INTERNET EXTENSION TO RING A CONVENTIONAL EXTENSION

This application claims the benefit of priority based on Taiwan Patent Application No. 097144925 filed on Nov. 20, 2008, the disclosures of which are incorporated by reference herein in their entirety.

CROSS-REFERENCES TO RELATED APPLICATIONS

Not applicable.

BACKGROUND OF THE INVENTION

1. Field of the Invention

The present invention relates to a method, an apparatus, and a computer readable medium thereof for enabling an Internet extension to ring a conventional extension. More particularly, the present invention relates to a method, an apparatus, and a computer readable medium thereof for enabling an Internet extension to ring a conventional extension without the need of an expensive IP-Private Branch Exchange (IP-PBX).

2. Descriptions of the Related Art

In the past, conventional telephones/extensions of conventional telecommunication frameworks have been applied in business entities for communications with external customers/intra-company communications. A conventional telecommunication framework can be implemented by a private branch exchange (PBX). The conventional telecommunication framework exchanges voice data outwards via a public telephone switch network (PTSN; e.g., ChungHwa Telecom), and is connected inwards to conventional extensions within the company.

PTSN has a circuit switch nature. In other words, during a communication process between two parties, a private talking circuit is established between the respective conventional telephones of both parties via a telephone line, while other parties are not allowed to transmit voice data via this telephone line. For frequent communications between different sub-companies or with external customers, a company must apply to ChungHwa Telecom for a number of telephone lines to prevent failure of establishing a talking circuit due to busy lines. Consequently, the company has to pay an appreciable amount of money for the number of telephone lines. Thus, developers have tried to reduce the communication fees to drop the overall operational costs. Accordingly, voice over IP (VoIP) technology has been developed with costs considered.

VoIP is a technical solution that transmits/receives digitalized voice packets via the Internet. As a conventional telephone which allows the connection of a number of extensions, the VoIP telephone also allows the connection of a number of Internet extensions via an IP-PBX. Unlike conventional telephones/extensions that are restricted within the reach of telephone lines, the VoIP telephones/extensions can be installed at any place where the Internet is accessible, so they can be deployed across a wider area.

Nowadays, many companies have established an enterprise telephone network that combines conventional extensions and Internet extensions together to accommodate both the legacy conventional extensions and the lower-cost Internet extensions. However, enabling conventional extensions and Internet extensions in the enterprise telephone network to ring each other is still an important issue.

FIG. 1 illustrates an enterprise telephone network 1 incorporating both conventional extensions and Internet extensions in prior art. The enterprise telephone network 1 comprises a PTSN 15, a hybrid IP-PBX 11, an Internet 13, conventional extensions 14a, 14b and Internet extensions 12a, 12b. The hybrid IP-PBX 11 is an upgraded version of conventional PBX hardware, which allows the Internet extensions 12a, 12b to ring conventional extensions 14a, 14b via the Internet 13 and the hybrid IP-PBX 11. On the other hand, the Internet extensions 12a, 12b are also able to make outside calls via the Internet 13, the hybrid IP-PBX 11 and the PTSN 15. Unfortunately, the hybrid IP-PBX 11 has a prohibitive price of tens to hundreds of millions of New Taiwan dollars, which can be afforded by only few enterprises.

Accordingly, it is important to provide a solution that can enable an Internet extension to ring a conventional extension at a lower cost while still maintaining the quality of connection.

SUMMARY OF THE INVENTION

One objective of this invention is to provide an apparatus for enabling an Internet extension to ring a conventional extension. An enterprise telephone network comprises the Internet extension and the conventional extension. The Internet extension has an Internet extension number, and the conventional extension has a conventional extension number.

To this end, the apparatus comprises a Session Initiation Protocol (SIP) proxy and a Real-Time Transport Protocol (RTP) relay. The SIP proxy is configured to receive a calling request comprising the conventional extension number from the Internet extension, substitute an exchange number of the enterprise telephone network for the conventional extension number in the calling request, and transmit the substituted calling request to a gateway having the exchange number according to the exchange number so that the gateway transmits a ring signal to a voice automatic machine via a telephone exchange in response to the substituted calling request.

The SIP proxy is further configured to receive an acknowledged (ACK) signal which represents a reply of the voice automatic machine to the ring signal from the gateway, transmit the ACK signal to the Internet extension, receive a response signal from the Internet extension, and transmit the response signal generated by the Internet extension in response to the ACK signal to the gateway, and transmit a correspondence relationship between the conventional extension number and the Internet extension number. The RTP relay is configured to receive and store the correspondence relationship.

Another objective of this invention is to provide a method for enabling an Internet extension to ring a conventional extension. An enterprise telephone network comprises the Internet extension and the conventional extension. The Internet extension has an Internet extension number, and the conventional extension has a conventional extension number.

To this end, the method of this invention comprises the steps of: (a) receiving a calling request comprising the conventional extension number from the Internet extension; (b) substituting an exchange number of the enterprise telephone network for the conventional extension number in the calling request; (c) transmitting the substituted calling request to a gateway having the exchange number according to the exchange number so that the gateway can transmit a ring signal to a voice automatic machine via a telephone exchange in response to the substituted calling request; (d) receiving an ACK signal which represents a reply of the voice automatic machine to the ring signal from the gateway; (e) transmitting the ACK signal to the Internet extension; (f) receiving a response signal from the Internet extension, the response signal being generated by the Internet extension in response to the ACK signal; and (g) transmitting the response signal to the gateway.

Yet a further objective of this invention is to provide a computer readable medium. The computer readable medium stores a program for enabling an Internet extension to ring a conventional extension. When the program is loaded in a microprocessor, the program enables a microprocessor to execute a plurality of codes. The codes enable the microprocessor to accomplish the steps of the method for enabling an Internet extension to ring a conventional extension described above.

According to the aforementioned description, the SIP proxy is able to substitute the number within a signal and the RTP relay is able to generate and forward a dual tone multi frequency (DTMF) packet. Hence, by simply having the SIP proxy and RTP relay, the present invention is able to provide function of the hybrid IP-PBX in the prior art. As a result, hardware complexity and cost can be reduced remarkably.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

This invention provides an apparatus, a method, and a computer readable medium thereof for enabling an Internet extension to ring a conventional extension. As compared to the prior art, the apparatus, method, and computer program product thereof disclosed in this invention reduce the cost for an Internet extension to ring a conventional extension. In the following description, this invention will be explained with reference to the embodiments. Descriptions of these embodiments are only intended to illustrate rather than to limit the present invention. It should be appreciated that in the following embodiments and the attached drawings, elements unrelated to this invention are omitted from depiction and dimensional relationships among individual elements in the attached drawings are illustrated only for ease of understanding, but not to limit the actual scale.

Figure 1:
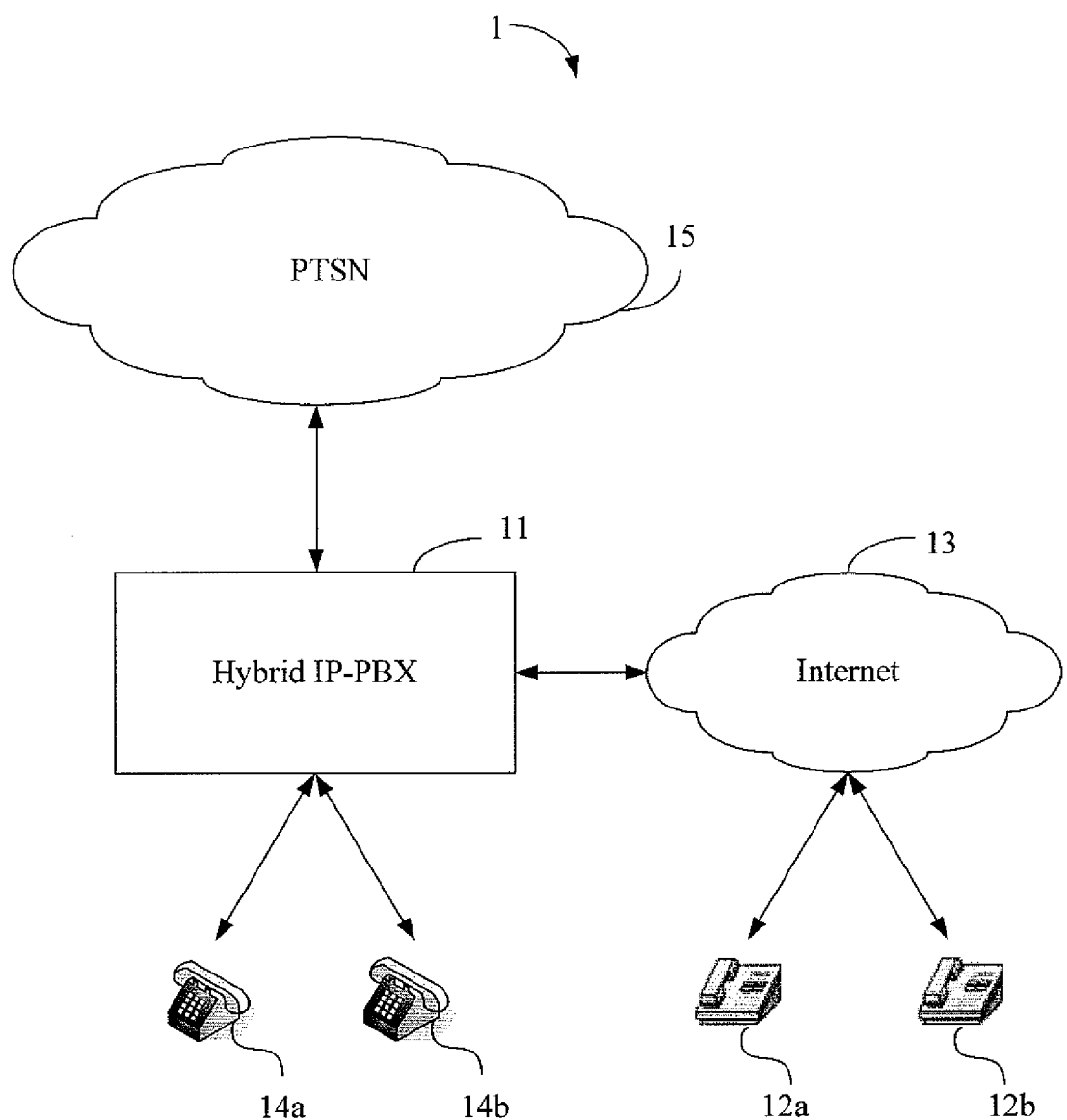
FIG. 1 is a schematic view illustrating an enterprise telephone network in the prior art.
Figure 2:
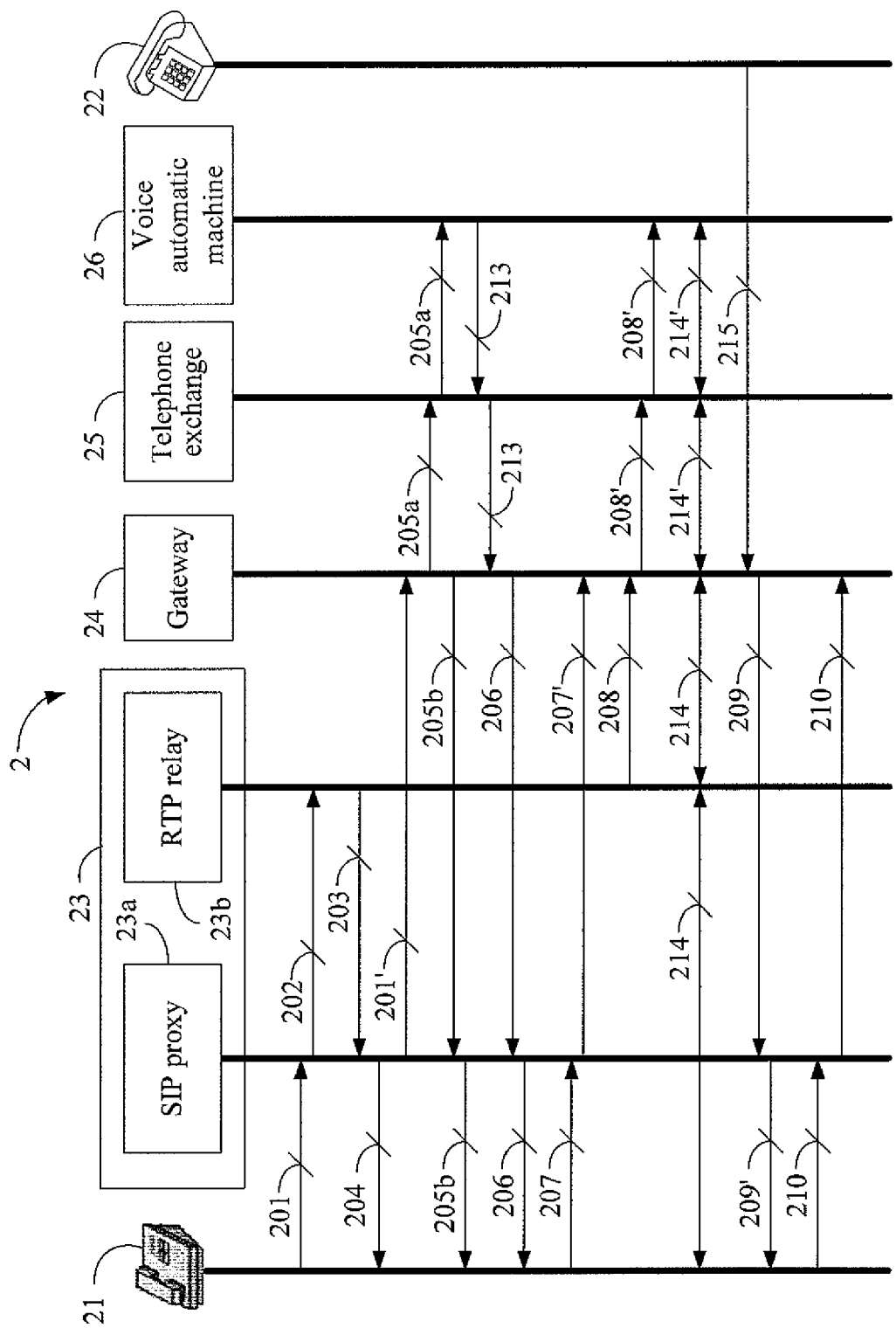
FIG. 2 is a schematic view of a first embodiment of this invention.

FIG. 2 illustrates a first embodiment of the present invention, which is an enterprise telephone network 2. The enterprise telephone network 2 comprises an Internet extension 21, a conventional extension 22, an apparatus for enabling the Internet extension 21 to ring the conventional extension 22 (hereinafter simply referred to as a ringing apparatus 23), a gateway 24, a telephone exchange 25, and a voice automatic machine 26. The ringing apparatus 23 comprises a Session Initiation Protocol (SIP) proxy 23a and a Real-Time Transport Protocol (RTP) relay 23b. The Internet extension 21, the conventional extension 22, the gateway 24, the telephone exchange 25, and the voice automatic machine 26 are standardized facilities in the art, and thus will not be described in detail herein.

It should be appreciated that only one single ringing apparatus 23 is enough for the enterprise telephone network 2 when the enterprise telephone network 2 is deployed in a school. However, in other embodiments, an enterprise telephone network may be provided with other numbers of ringing apparatuses 23 to avoid communication interruption due to the failure of any ringing apparatus 23. In other words, the number of ringing apparatus 23 is not intended to limit the scope of this present invention.

The Internet extension 21 has an Internet extension number (e.g., 6000), while the conventional extension 22 has a conventional extension number (e.g., 2025). Initially, when a user intends to call the conventional extension 22 from the Internet extension 21, the user dials on the Internet extension 21 the conventional extension number (i.e., 2025) of the conventional extension 22. After the user dials the conventional extension number (i.e., 2025), the Internet extension 21 generates a calling request 201 comprising the conventional extension number (i.e., 2025) of the conventional extension 22. The SIP proxy 23a receives the calling request 201 from the Internet extension 21. In this embodiment, the calling request 201 is a standard invitation signaling in the VoIP framework and the calling request 201 is with the content of "invite 2025@ . . . ". The invitation signaling in the VoIP framework is well-known to those of ordinary skill in the art and, thus, will not be further described herein.

After the SIP proxy 23a receives the calling request 201, the SIP proxy 23a transmits a correspondence relationship 202 between the Internet extension number (i.e., 6000) and the conventional extension number (i.e., 2025) to the RTP relay 23b. The RTP relay 23b then stores the correspondence relationship. Next, the RTP relay 23b assigns an IP address and a port to an RTP channel according to the correspondence relationship 202. The RTP relay 23b transmits an assignment signal 203 comprising the IP address and the port to the SIP proxy 23a so that the Internet extension 21 and the conventional extension 22 can subsequently transmit voice packets to each other according to the assignment signal 203.

Afterwards, the SIP proxy 23a substitutes an exchange number (e.g., 0282122000) of the enterprise telephone network 2 for the conventional extension number (i.e., 2025) in the calling request 201. In this embodiment, the substituted calling request 201' is also a standard invitation signaling in the VoIP framework and is with content of "invite 0282122000@ . . . ". Subsequently, the SIP proxy 23a transmits the substituted calling request 201' to the gateway 24 having this exchange number according to the exchange number (i.e., 0282122000). The SIP proxy 23a also transmits a trying signal 204 to the Internet extension 21 to inform the Internet extension 21 that the calling request 201 is under process. In this embodiment, the trying signal 204 is a standard trying signal in the VoIP framework and is with the content of "100 trying". The standard trying signaling in the VoIP framework is well-known to those of ordinary skill in the art and, thus, will not be further described herein.

On the other hand, after the gateway 24 receives the substituted calling request 201' from the SIP proxy 23a, the gateway 24 transmits a first ring signal 205a to the voice automatic machine 26 via the telephone exchange 25. Specifically, the gateway 24 first transmits the first ring signal 205a to the telephone exchange 25, and the telephone exchange 25 then transmits the first ring signal 205a to the voice automatic machine 26. Then, the gateway 24 transmits a second ring signal 205b to the SIP proxy 23a, the SIP proxy 23a then transmits the second ring signal 205b to the Internet extension 21. At this moment, the user at the Internet extension 21 hears the ringtone from the handset of the Internet extension 21. The second ring signal 205b is a standard ring signaling in the VoIP framework and is with the content of either "183 Ringing" or "180 Ringing". The standard ring signaling in the VoIP framework is well-known to those of ordinary skill in the art and, thus, will not be further described herein.

When the voice automatic machine 26 detects the first ring signal 205a, the voice automatic machine 26 automatically off-hooks and plays a greeting message. The telephone exchange 25 detects the off-hook operation 213 of the voice automatic machine 26, and the gateway 24 detects the off-hook operation 213 of the voice automatic machine 26 via the telephone exchange 25.

In response to the detected off-hook operation 213 of the voice automatic machine 26, the gateway 24 transmits an ACK signal 206 to the SIP proxy 23a, wherein the ACK signal 206 represents a reply of the voice automatic machine 26 to the first ring signal 205a. The SIP proxy 23a receives the ACK signal 206 from the gateway 24 and transmits the ACK signal 206 to the Internet extension 21. In this embodiment the ACK signal 206 is a standard ACK signaling in the VoIP framework and is with content of "200 OK". The standard ACK signaling in the VoIP framework is well-known to those of ordinary skill in the art and, thus, will not be further described herein.

After the Internet extension 201 receives the ACK signal 206, the Internet extension 21 generates a response signal 207 comprising the conventional extension number (i.e., 2025). The SIP proxy 23a then receives the response signal 207 from the Internet extension 21. In this embodiment, the response signal 207 is a standard response signaling in the VoIP framework and is with content of "ACK 2025@ . . . ". The standard response signaling in the VoIP framework is well-known to those of ordinary skill in the art and, thus, will not be further described herein. After the SIP proxy 23a receives the response signal 207, the SIP proxy 23a substitutes the exchange number (i.e., 0282122000) for the conventional extension number (i.e., 2025) in the response signal 207. The SIP proxy 23a then transmits the substituted response signal 207' to the gateway 24 according to the exchange number. In this embodiment, the response signal 2071 has the content of "ACK 0282122000@ . . . ".

Subsequently, the RIP relay 23b generates a sound message 208 by forming the conventional extension number (i.e., 2025) in the dual tone multi frequency (DTMF) format. In particular, the sound message 208 is an RTP packet comprising a content of DTMF=2025. The RTP relay 23b then transmits the sound message 208 to the gateway 24. After the gateway 24 converts the sound message 208 into an analog signal 208' in DTMF format, the gateway 24 transmits the analog signal 208' to the voice automatic machine 26 via the telephone exchange 25. It should be noted that the analog signal 208' is essentially the keytone of the conventional extension number (i.e., 2025). After the voice automatic machine 26 receives the analog signal 208', the voice automatic machine 26 forwards it to the conventional extension 22. Then, the conventional extension 22 will ring so that another user may off-hook the conventional extension 22 to begin a conversation.

During the conversation, the Internet extension 21 transmits the RTP packet 214 in a digital form to the gateway 24 via the RTP relay 23b according to the assigned IP address and the port. The gateway 24 converts the RTP packet 214 in digital form into an analog voice packet 214' for transmission to the conventional extension 22 via the telephone extension 25. Similarly, the gateway 24 also converts the analog voice packet 214' from the conventional extension 22 into the RTP packet 214 in digital form for transmission to the Internet extension 21 via the RTP relay 23b.

When the user of the conventional extension 22 hangs up (i.e., ends the conversation), the gateway 24 detects a hang-up signal 215 from the conventional extension 22. In response to the detected hang-up signal 215, the gateway 24 transmits a call termination request 209 comprising the exchange number (i.e., 0282122000) of the gateway 24. In this embodiment, the call termination request 209 is a standard termination signaling in the VoIP framework and is with the content of "BYE 0282122000@ . . . ".

After the SIP proxy 23a receives the call termination request 209, the SIP proxy 23a substitutes the Internet extension number (i.e., 6000) of the Internet extension 21 for the exchange number in the call termination request 209. In this embodiment, the substituted call termination request 209' has the content of "BYE 6000@". Afterwards, the SIP proxy 23a transmits the substituted call termination request 209' to the Internet extension 21 according to the Internet extension number (i.e., 6000). The Internet extension 21 then terminates the conversation with the conventional extension 22 according to the substituted call termination request 209'. Next, the Internet extension 21 transmits an ACK signal 210 to the SIP proxy 23a. After the SIP proxy 23a receives the ACK signal 210, the SIP proxy 23ar transmits the ACK signal 210 to the gateway 24. The ACK signal 210 is a standard ACK signaling in the VoIP framework and is with the content of "200 OK". This ends the calling process between the Internet extension 21 and the conventional extension 22.

As described above, the first embodiment enables the Internet extension 21 to ring the conventional extension 22 in the following way: the SIP proxy 23a substitutes the exchange number for the conventional extension number in the calling request 201, and then the RTP relay 23b generates the sound message 208 comprising DTMF=2025. As compared to the conventional practice that deploys an expensive IP-PBX directly, this invention enables an Internet extension to ring a conventional extension at reduced cost.

Figure 3A:
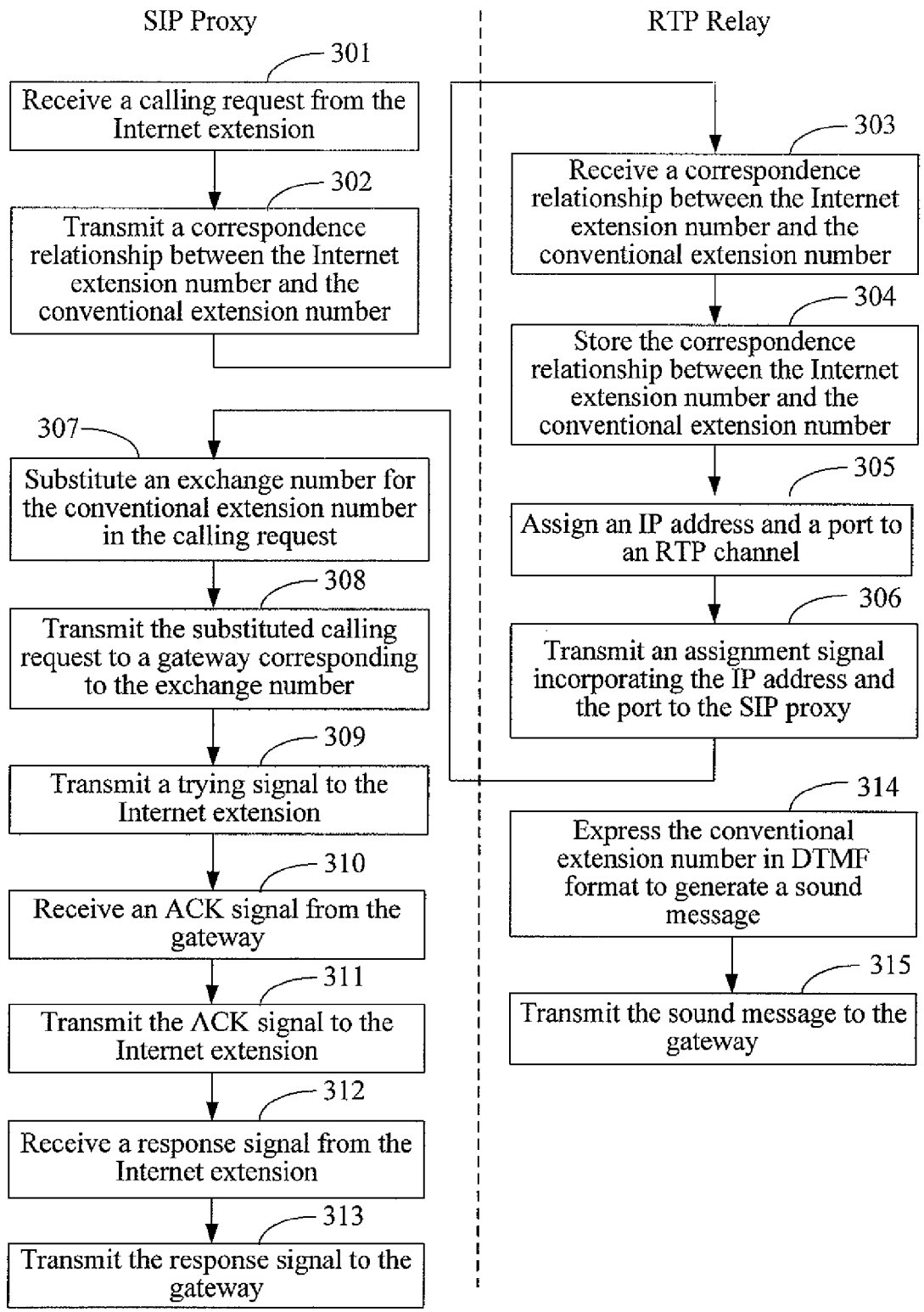
FIG. 3A is a partial schematic view of a second embodiment of this invention.
Figure 3B:
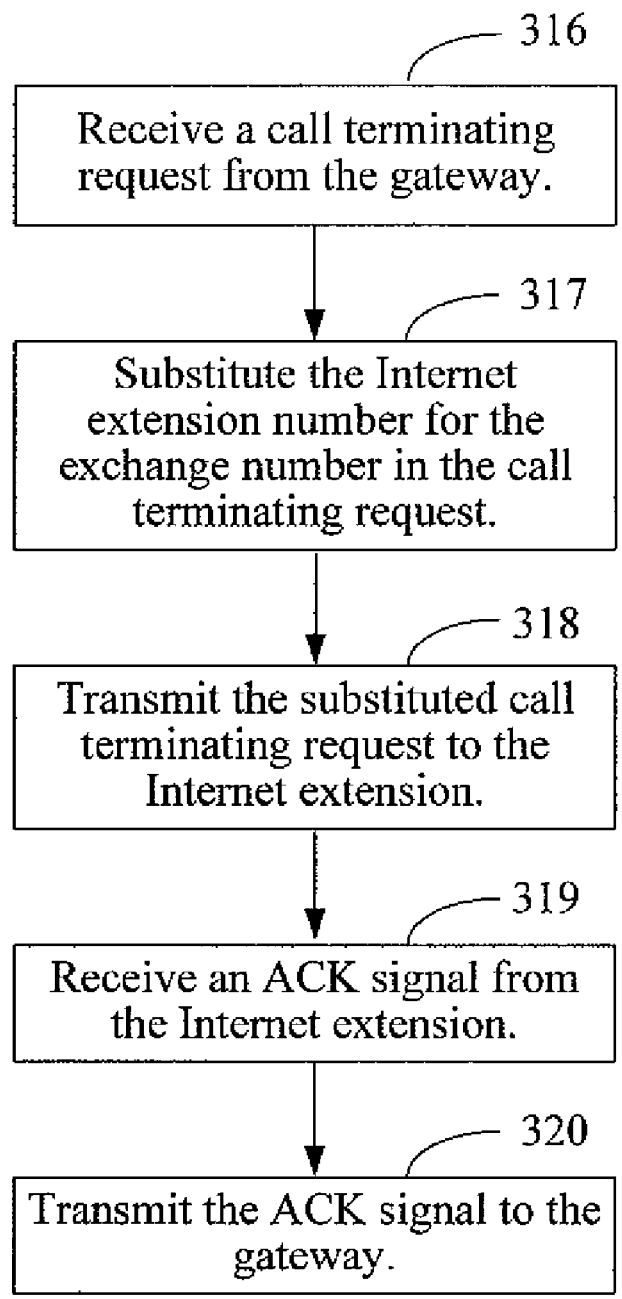
FIG. 3B is another partial schematic view of the second embodiment.

A second embodiment of this invention is a method for enabling an Internet extension to ring a conventional extension and the flowcharts of which are depicted in FIGS. 3A and 3B. This method of the second embodiment is applicable to the SIP proxy 23a and the RTP relay 23b as described in the first embodiment. Steps of FIG. 3A are shown in two columns, wherein the steps in the left column are executed by the SIP proxy 23a and those in the right column are executed by the RTP relay 23b. Steps in FIG. 3B are all executed by the SIP proxy 23a.

As described in the first embodiment, the SIP proxy 23a and the RTP relay 23b are comprised in an enterprise telephone network. As with the first embodiment, this enterprise telephone network further comprises an Internet extension, a conventional extension, a gateway, a telephone exchange, and a voice automatic machine. The Internet extension and the conventional extension have an Internet extension number and a conventional extension number respectively.

The second embodiment begins with Step 301 to enable the SIP proxy 23a to receive a calling request comprising the conventional extension number of the conventional extension from the Internet extension. Then, Step 302 enables the SIP proxy 23a to transmit a correspondence relationship between the Internet extension number and the conventional extension number to the RTP relay 23b after receiving the calling request.

Next, Step 303 enables the RTP relay 23b to receive the aforesaid correspondence relationship. In Step 304, this correspondence relationship is stored. This method further proceeds to Step 305 to enable the RTP relay 23b to assign an IP address and a port to an RTP channel according to the correspondence relationship. In Step 306, the RTP relay 23b transmits an assignment signal comprising the IP address and the port to the SIP proxy 23a.

In Step 307, the SIP proxy 23a substitutes an exchange number of the enterprise telephone network for the conventional extension number in the calling request received in Step 301. In Step 308, the SIP proxy 23a transmits the substituted calling request to a gateway corresponding to the exchange number according to the exchange number. In Step 309, the SIP proxy 23a transmits a trying signal to the Internet extension to inform that the calling request is under process.

On the other hand, subsequent to Step 308, the gateway having the exchange number transmits a ring signal to the voice automatic machine in response to the substituted calling request. After detecting the ring signal, the voice automatic machine automatically off-hooks and plays a greeting message. The telephone exchange then detects the off-hook operation of the voice automatic machine, and in turn, the gateway detects the off-hook operation of the voice automatic machine via the telephone exchange. In response to the detection of the off-hook operation of the voice automatic machine, the gateway transmits an ACK signal to the SIP proxy 23a.

The method then proceeds to Step 310 to enable the SIP proxy 23a to receive the ACK signal from the gateway. The ACK signal represents a reply of the voice automatic machine to the calling request. Next in Step 311, the SIP proxy 23a transmits the ACK signal to the Internet extension. In Step 312, the SIP proxy 23a receives a response signal from the Internet extension, wherein the response signal is generated by the Internet extension in response to the ACK signal and comprises the conventional extension number. In step 313, the SIP proxy 23a substitutes the exchange number for the conventional extension number in the response signal and transmits the substituted response signal to the gateway.

Then in Step 314, the RTP relay 23b generates a sound message by forming the conventional extension number in the DTMF format. The sound message is an RTP packet. Subsequently, the RTP relay 23b transmits the sound message to the gateway in Step 315. Then, a conversation can begin between the Internet extension and the conventional extension.

When the call is to be terminated, the SIP proxy 23a receives a call termination request comprising the exchange number of the gateway from the gateway in Step 316. Then, the SIP proxy 23a substitutes the Internet extension number for the exchange number in the call termination request in Step 317 and transmits the substituted call termination request to the Internet extension in Step 318. In Step 319, the SIP proxy 23a receives an ACK signal from the Internet extension. Finally, in Step 320, the SIP proxy 23a transmits the ACK signal to the gateway, thus terminating the call between the Internet extension and the conventional extension.

In addition to the aforesaid steps, the second embodiment can also execute all the operations and functions of the wireless network system described in the first embodiment. The methods in which the second embodiment executes these operations and functions will be readily appreciated by those of ordinary skill in the art based on the explanation of the wireless network system described in the first embodiment, and thus will not be further described herein.

A third embodiment of this invention is a computer readable medium, which stores a program for enabling an Internet extension to ring a conventional extension stored therein. An enterprise telephone network comprises the Internet extension and the conventional extension. When the program is loaded in a microprocessor, the microprocessor executes a plurality of codes to accomplish the steps of the second embodiment described above.

The computer readable medium of the third embodiment may be a read only memory (ROM), a flash memory, a floppy disk, a hard disk, a compact disk, a mobile disk, a magnetic tape, a database accessible to networks, or any other storage media with the same function and well known to those skilled in the art.

In summary, according to this invention, the SIP proxy substitutes the exchange number of the enterprise telephone network for the conventional extension number in the calling request, and then the RTP relay generates the conventional extension number in DTMF format for transmission to the gateway. In this way, this invention enables the Internet extension to ring the conventional extension by simply using the additional SIP proxy and RTP relay in conjunction with the conventional telephone exchange. As compared to the conventional solution that enables the Internet extension to ring the conventional extension by use of a hybrid IP-PBX, this invention remarkably reduces costs.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for enabling an Internet extension to ring a conventional extension, an enterprise telephone network comprising the Internet extension and the conventional extension, the method comprising the steps of:
   (a) receiving a calling request from the Internet extension, the calling request comprising a conventional extension number of the conventional extension;
   (b) assigning an IP address and a port to a real-time transport protocol (RTP) channel according to a correspondence relationship between the Internet extension number and the conventional extension number;
   (c) transmitting the IP address and port using an assignment signal so that the internet extension and the conventional extension can transmit voice packets to each other according to the assignment signal;
   (d) substituting an exchange number of the enterprise telephone network for the conventional extension number in the calling request;
   (e) transmitting the substituted calling request to a gateway having the exchange number according to the exchange number so that the gateway transmits a ring signal to a voice automatic machine via a telephone exchange in response to the substituted calling request;
   (f) receiving an acknowledge (ACK) signal from the gateway, the ACK signal representing a reply of the voice automatic machine to the ring signal;
   (g) transmitting the ACK signal to the Internet extension;
   (h) receiving a response signal from the Internet extension, the response signal is generated by the Internet extension in response to the ACK signal; and
   (i) transmitting the response signal to the gateway.

2. The method of claim 1, further comprising the step of:
transmitting a sound message to the gateway so that the gateway transmits the sound message to the voice automatic machine via the telephone exchange, wherein the sound message is the conventional extension number in dual tone multi frequency (DTMF) format.

3. The method of claim 2, further comprising the step of:
generating the sound message by forming the conventional extension number in the DTMF format.

4. The method of claim 2, wherein the response signal comprises the conventional extension number and the method further comprises the step of:
substituting the exchange number for the conventional extension number in the response signal after the step (h).

5. The method of claim 1, wherein the Internet extension has an Internet extension number and the method further comprises the step of:
storing a correspondence relationship between the Internet extension number and the conventional extension number.

6. The method of claim 2, wherein the sound message is a real-time transport protocol (RTP) packet.

7. The method of claim 2, further comprising the steps of:
receiving a call termination request from the gateway, the call termination request comprising the exchange number;
substituting the Internet extension number for the exchange number in the call termination request; and
transmitting the substituted call termination request to the Internet extension according to the Internet extension number so that the Internet extension terminates the call with the conventional extension.

8. A non-transitory computer readable medium stored a program for enabling an Internet extension to ring a conventional extension, an enterprise telephone network comprising the Internet extension and the conventional extension, the program executing the following codes after being loaded in a microprocessor:
code A for enabling the microprocessor to receive a calling request from the Internet extension, wherein the calling request incorporates a conventional extension number of the conventional extension;
code B for enabling the microprocessor to assign an IP address and a port to a real-time transport protocol (RTP) channel according to a correspondence relationship between the Internet extension number and the conventional extension number;
code C for enabling the microprocessor to transmit the IP address and port using an assignment signal so that the internet extension and the conventional extension can transmit voice packets to each other according to the assignment signal;
code (D) for enabling the microprocessor to substitute an exchange number of the enterprise telephone network for the conventional extension number in the calling request;
code (E) for enabling the microprocessor to transmit the substituted calling request to a gateway having the exchange number according to the exchange number so that the gateway transmits a ring signal to a voice automatic machine via a telephone exchange in response to the substituted calling request;
code (F) for enabling the microprocessor to receive an ACK signal from the gateway, the ACK signal representing a reply of the voice automatic machine to the ring signal;
code (G) for enabling the microprocessor to transmit the ACK signal to the Internet extension;
code (H) for enabling the microprocessor to receive a response signal from the Internet extension, the response signal being generated by the Internet extension in response to the ACK signal; and
code (I) for enabling the microprocessor to transmit the response signal to the gateway.

9. The non-transitory computer readable medium of claim 8, wherein the program further executes the following code:
code (I) for enabling the microprocessor to transmit a sound message to the gateway so that the gateway transmits the sound message to the voice automatic machine via the telephone exchange, wherein the sound message is the conventional extension number in the DTMF format.

10. The non-transitory computer readable medium of claim 9, wherein the program further executes the following code:
code (K) for enabling the microprocessor to generate the sound message by forming the conventional extension number in the DTMF format.

11. The non-transitory computer readable medium of claim 9, wherein the response signal comprises the conventional extension number, and the program further executes the following code:
code (K) for enabling the microprocessor to substitute the exchange number for the conventional extension number in the response signal after code (H).

12. The non-transitory computer readable medium of claim 8, wherein the Internet extension has an Internet extension number and the program further executes the following code:
code (J) for enabling the microprocessor to store a correspondence relationship between the Internet extension number and the conventional extension number.

13. The non-transitory computer readable medium of claim 9, wherein the sound message is a RTP packet.

14. The non-transitory computer readable medium of claim 9, wherein the program further executes the following code:
code (K) for enabling the microprocessor to receive a call termination request from the gateway, the call termination request comprising the exchange number;
code (L) for enabling the microprocessor to substitute the Internet extension number for the exchange number in the call termination request; and
code (M) for enabling the microprocessor to transmit the substituted call termination request to the Internet extension according to the Internet extension number so that the Internet extension terminates the call with the conventional extension.

15. An apparatus for enabling an Internet extension to ring a conventional extension, an enterprise telephone network comprising the Internet extension and the conventional extension, the Internet extension having an Internet extension number, the apparatus comprising:
a Session Initiation Protocol (SIP) proxy, being configured to receive a calling request comprising a conventional extension number of the conventional extension from the Internet extension, substitute an exchange number of the enterprise telephone network for the conventional extension number in the calling request, transmit the substituted calling request to a gateway having the exchange number according to the exchange number so that the gateway transmits a ring signal to a voice automatic machine via a telephone exchange in response to the substituted calling request, receive an ACK signal representing a reply of the voice automatic machine to the ring signal from the gateway, transmit the ACK signal to the Internet extension, receive a response signal from the Internet extension, transmit the response signal generated by the Internet extension in response to the ACK signal to the gateway, and transmit a correspondence relationship between the conventional extension number and the Internet extension number; and a Real-Time Transport Protocol (RTP) relay, being configured to receive and store the correspondence relationship and assign an IP address and a port to an RTP channel according to the correspondence relationship, and being configured to transmit an assignment signal comprising the IP address and the port to the SIP proxy so that the Internet extension and the conventional extension can subsequently transmit voice packets to each other according to the assignment signal.

16. The apparatus of claim 15, wherein the RTP relay is further configured to transmit a sound message to the gateway so that the gateway transmits the sound message to the voice automatic machine via the telephone exchange, wherein the sound message is the conventional extension number in the DTMF format.

17. The apparatus of claim 16, wherein the RTP relay is further configured to generate the sound message by forming the conventional extension number in the DTMF format.

18. The apparatus of claim 16, wherein the response signal comprises the conventional extension number, and the SIP proxy is further configured to substitute the exchange number for the conventional extension number in the response signal after receiving the response signal.

19. The apparatus of claim 15, wherein the sound message is an RTP packet.

20. The apparatus of claim 16, wherein the SIP proxy is further configured to receive a call termination request comprising the exchange number from the gateway, substitute the Internet extension number for the exchange number in the call termination request, and transmit the call termination request to the Internet extension according to the Internet extension number so that the Internet extension terminates the call with the conventional extension.

* * * * *